(12) United States Patent
Chu et al.

(10) Patent No.: US 8,824,134 B2
(45) Date of Patent: Sep. 2, 2014

(54) TABLET ELECTRONIC DEVICE

(75) Inventors: Chao-Ming Chu, Taipei (TW); Peter Clark Timothy, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 92 days.

(21) Appl. No.: 13/275,773

(22) Filed: Oct. 18, 2011

(65) Prior Publication Data

US 2012/0106047 A1 May 3, 2012

Related U.S. Application Data

(60) Provisional application No. 61/407,663, filed on Oct. 28, 2010.

(51) Int. Cl.
*G06F 1/16* (2006.01)
*H05K 5/00* (2006.01)
*H05K 7/00* (2006.01)

(52) U.S. Cl.
USPC .................................................. 361/679.4

(58) Field of Classification Search
None
See application file for complete search history.

(56) References Cited

U.S. PATENT DOCUMENTS

| | | | | |
|---|---|---|---|---|
| 5,100,098 A | * | 3/1992 | Hawkins | 248/291.1 |
| 5,438,475 A | * | 8/1995 | Bradley | 361/679.55 |
| 5,646,818 A | * | 7/1997 | Hahn | 361/679.09 |
| 5,657,459 A | * | 8/1997 | Yanagisawa et al. | 361/679.21 |
| 5,675,524 A | * | 10/1997 | Bernard | 708/109 |
| 5,737,183 A | * | 4/1998 | Kobayashi et al. | 361/679.58 |
| 5,751,547 A | * | 5/1998 | Honda et al. | 361/679.43 |
| 6,016,248 A | * | 1/2000 | Anzai et al. | 361/679.59 |
| 6,301,101 B1 | * | 10/2001 | Anzai et al. | 361/679.3 |
| 7,042,713 B2 | * | 5/2006 | Nicolosi | 361/679.44 |
| 7,123,471 B2 | * | 10/2006 | Wang et al. | 361/679.09 |
| 7,136,050 B2 | * | 11/2006 | Kyouzuka et al. | 345/173 |
| 7,206,198 B2 | * | 4/2007 | Wang | 361/679.55 |
| 7,240,443 B2 | * | 7/2007 | Nathanson et al. | 40/124.06 |
| 7,428,145 B2 | * | 9/2008 | Kobayashi et al. | 361/679.55 |
| 7,502,222 B2 | * | 3/2009 | Cheng et al. | 361/679.55 |
| 7,916,478 B2 | * | 3/2011 | Tu et al. | 361/679.59 |
| 7,937,810 B2 | * | 5/2011 | Hu | 16/241 |
| 7,952,569 B2 | * | 5/2011 | Hunt et al. | 345/179 |
| 8,289,688 B2 | * | 10/2012 | Behar et al. | 361/679.3 |
| 2006/0034045 A1 | * | 2/2006 | Wang | 361/683 |

(Continued)

FOREIGN PATENT DOCUMENTS

| | | |
|---|---|---|
| CN | 101109974 | 1/2008 |
| TW | 275375 | 5/1996 |

(Continued)

*Primary Examiner* — Hoa C Nguyen
*Assistant Examiner* — Xanthia C Cunningham
(74) *Attorney, Agent, or Firm* — Muncy, Geissler, Olds & Lowe, P.C.

(57) ABSTRACT

A tablet electronic device is disclosed. The tablet electronic device includes a first side, a second side and an electronic component. The first side has a first thickness. The second side is opposite to the first side and has a second thickness. The second thickness is larger than the first thickness. The second side has a recess. The electronic component is accommodated in the recess such that a gravity center of the tablet electronic device is adjusted towards the second side. The tablet electronic device has a holding portion and the center of gravity of the tablet electronic device is arranged in a suitable position, thus the tablet electronic device disclosed herein can be comfortably operated while being held in a user's hand. Furthermore, the tablet electronic device can be set in various ways for comfortable usage.

12 Claims, 8 Drawing Sheets

(56) References Cited

U.S. PATENT DOCUMENTS

| | | | |
|---|---|---|---|
| 2007/0127197 A1* | 6/2007 | Tae et al. | 361/681 |
| 2007/0211420 A1* | 9/2007 | Bang | 361/683 |
| 2007/0223184 A1* | 9/2007 | Garrett | 361/681 |
| 2008/0068786 A1* | 3/2008 | Cheng et al. | 361/683 |
| 2008/0266768 A1* | 10/2008 | Drew | 361/681 |
| 2009/0021910 A1* | 1/2009 | Lai et al. | 361/695 |
| 2009/0237878 A1* | 9/2009 | Chen | 361/679.55 |
| 2009/0303676 A1* | 12/2009 | Behar et al. | 361/679.27 |
| 2009/0316355 A1* | 12/2009 | Jones | 361/679.55 |
| 2010/0214730 A1* | 8/2010 | Titzler et al. | 361/679.21 |
| 2010/0220441 A1* | 9/2010 | Berlekamp | 361/679.54 |
| 2012/0176741 A1* | 7/2012 | Wu et al. | 361/679.09 |

FOREIGN PATENT DOCUMENTS

| | | |
|---|---|---|
| TW | 577559 | 2/2004 |
| TW | 587742 | 5/2004 |
| TW | M261726 | 4/2005 |
| TW | I291605 | 12/2007 |
| TW | I301528 | 10/2008 |
| TW | I319701 | 1/2010 |

\* cited by examiner

TABLET ELECTRONIC DEVICE

CROSS REFERENCE TO RELATED APPLICATIONS

The non-provisional patent application claims priority to U.S. provisional patent application with Ser. No. 61/407,663 filed on Oct. 28, 2010. This and all other extrinsic materials discussed herein are incorporated by reference in their entirety.

BACKGROUND OF THE INVENTION

1. Field of Invention

The invention relates to a tablet electronic device and, more particularly, to a tablet electronic device with a holding structure.

2. Related Art

A tablet personal computer (also called a tablet PC, a tablet, or slates for short) is a small and portable personal computer, and a touch screen is used as a main input device. The touch screen of the tablet PC allows a user to input information directly via built-in input modules, such as a handwriting recognition module, a virtual keyboard on the screen or a voice recognition module instead of a conventional keyboard and mouse. Furthermore, compared to a notebook, a personal digital assistant (PDA) and a smart phone, the lighter tablet PC has a larger screen is more convenient for the user.

The monitor size of the current tablet PC is usually between seven to twelve inches, and the tablet PC has three major types, a rotatable-type, a panel-type, and a multimulti-type. A rotatable-type tablet PC looks like a notebook, its processor and calculating elements are disposed under the keyboard or a base portion, and the user can rotate the screen for 180 degrees to cover the keyboard as a plane type. A panel-type tablet PC is usually configured with a touch screen and a stylus, and the calculating elements are disposed under the screen. It may also connect to an external keyboard or inserted to a docket to have more expanding functions. A multi-type tablet PC is similar to the rotatable-type tablet PC, and the difference is that the keyboard or the base portion is detachable. Thus, the multi-type tablet PC has the advantages of the rotatable-type tablet PC and the panel-type tablet PC.

Figure 1:
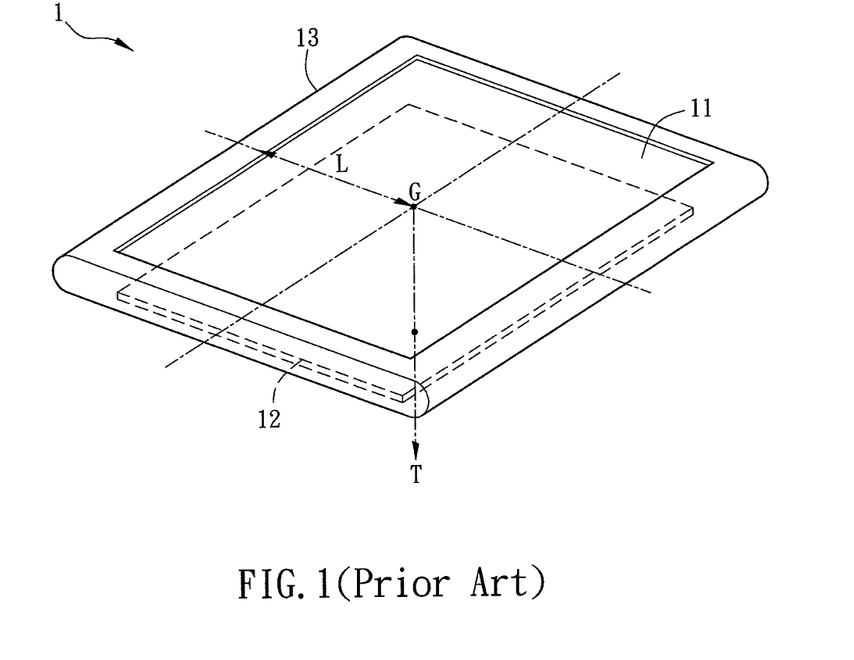
FIG. 1 is a schematic diagram showing a conventional tablet PC.

However, no matter what type the tablet PC is, the user usually holds one side of the tablet PC with one hand and operates it with the other hand. While outdoors or traveling with environmental limitations, more chances for users are holding the tablet PC with one hand instead of two hands. FIG. 1 is a schematic diagram showing a conventional tablet PC, and a panel-type tablet PC is taken as an example. The conventional tablet PC 1 includes a touch panel 11, a battery pack 12 and other necessary electronic components which omitted herein.

As shown in FIG. 1, the casing of the conventional tablet PC 1 has a symmetrical panel structure without a holding portion, and thus the user is difficult to hold it. Further, the battery pack 12 is usually a thin-type battery which is larger but thin. As the heaviest electronic component of the tablet PC 1, the battery pack 12 is usually disposed at the back of the tablet PC 1 to keep a gravity center G at geometric center of the tablet PC 1.

Nowadays, the weight of the conventional tablet PC is reduced to relieve discomfort and tiredness of the user's hand when holding the tablet PC. However, since the casing of the tablet PC is usually a flat plate, it is not easy to be hold. Additionally, due to the larger screen, a distance between the gravity center G and the holding side 13 of the tablet PC 1 is far, this increases the difficulties in holding the tablet PC, too. In more detail, taking holding side as an axis, and the distance L is the arm of force, the arm L of force multiples the total weight of the tablet PC 1 and the battery pack 12 (which can be regarded as applying force on the gravity center G), a rotating torque T thus obtained is very large, this perplex users to hold the tablet PC for a long time with one hand, and the user even may drop down the table PC while operation by accident.

SUMMARY OF THE INVENTION

A tablet electronic device is provided for users to hold the tablet PC for a long time with one hand in an easy way.

A tablet electronic device with a rotatable structure is provided. When the tablet electronic device is put flat, the rotatable structure provides an angle to make a more comfortable operation position. Furthermore, the tablet electronic device can be stood upright or be hanged easily without an additional docking for more conveniently use.

The tablet electronic device includes a first side, a second side and an electronic component. The first side has a first thickness. The second side is opposite to the first side and includes a recess. The second side has a second thickness, and the second thickness is larger than the first thickness. The electronic component is accommodated in the recess. The gravity center of the tablet electronic device is located near the second side. The electronic component is a battery pack, an adaptor or a combination thereof.

"The first side" refers to area near one side of periphery of the tablet electronic device and the adjacent parts. "The second side" refers to the area near other side opposite to the first side and the adjacent parts. For example, if the tablet electronic device is in a rectangular shape, the "first side" would refers to one of the longer sides and the adjacent parts, and the "second side" refers to another longer side oppositely and the adjacent parts. "The thickness" is a distance between a front panel with image displaying function of the tablet electronic device and the back panel.

The second side of the tablet electronic device disclosed herein is thicker than the first side to form a holding structure which is suitable for the user to hold with one hand easily and steady. Moreover, since a recess formed in the second side, some heavy electronic components can selectively accommodate therein, such as a battery pack of the tablet electronic device. Thus, the gravity center of the tablet electronic device is located near the second side to reduce the rotating torque, and then the user would not be tired or drop the tablet electronic device easily while using.

These and other features, aspects and advantages will become better understood with regard to the following description, appended claims, and accompanying drawings.

DETAILED DESCRIPTION OF THE INVENTION

A tablet electronic device is illustrated with relating figures, and the same symbols denote the same components.

Figure 2:
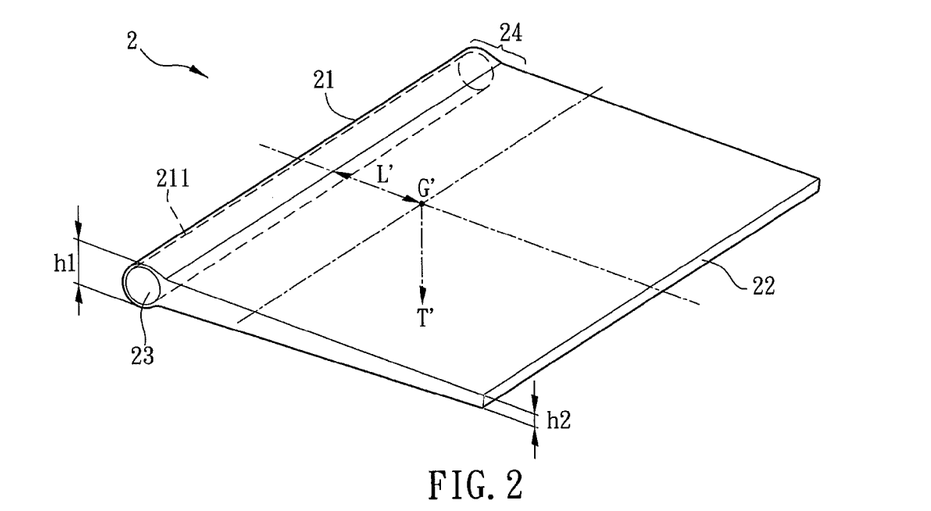
FIG. 2 is a schematic diagram showing a tablet electronic device in a first embodiment.

FIG. 2 is a schematic diagram showing that a tablet electronic device in a first embodiment. The tablet electronic device 2 includes a first side 22, a second side 21 and an electronic component 23. The second side 21 is thicker than that of the opposite first side 22, that is, the thickness h1 of the second side 21 is larger than the thickness h2 of the first side 22. The thickness difference of the tablet electronic device 2 between the thickness h1 and the thickness h2 may not be constant, and variation of the thickness difference of the tablet electronic device 2 between the second side 21 and the first side 22 is not limited thereto. It can be increased in a constant proportion (as shown in FIG. 2) or in a non-constant proportion at some suitable positions. For example, the thickness starts to change from one-eighth of the total width of the tablet electronic device 2 near the second side 21, which is not limited herein. The shape and the configuration of the second side 21 can have varies adjustment to facilitate the user in a comfortable holding position, which is not limited herein.

The second side 21 includes a recess 211 for accommodating the electronic component 23 of the tablet electronic device 2. The electronic component 23 may be a heaviest electronic component of the tablet electronic device 2, so as to adjust the gravity center G' of the tablet electronic device 2 near the second side 21. In an embodiment, the recess 211 may be an inner chamber formed in the casing of the tablet electronic device 2, or an accommodating space formed by a concave portion outside the casing in another embodiment, which is illustrated in detail in the following embodiments. The electronic component 23 is a battery pack in the embodiment, or may also be other electronic components such as an adaptor; however, it is not limited herein.

Furthermore, the electronic component 23 may be a cylindrical battery pack or a cannular battery pack which is suitable to accommodate in the recess 211. Compared to a thin-type battery, to produce the cylindrical battery pack and the cannular battery pack is a very well-known technique which can reduce the total cost in the practical usage. As shown in FIG. 2, compared to the conventional tablet electronic device, the gravity center G' is near the second side 21 in the disclosure. In other words, the gravity center G' of the tablet electronic device 2 shifts away from the geometric center and approaches the second side 21. The gravity center G' may shift along a single axis for a distance about a quarter of the width, which is not limited herein.

The second side 21 of the tablet electronic device 2 may be regarded as a holding portion 24 for the user to hold the tablet electronic device 2. When the user holds the tablet electronic device 2, a thicker structure fits better to a palm and a thumb web, and it meets the requirements of ergonomic and is easy to apply force. Consequently, when the user holds the tablet electronic device 2, the holding portion 24 of the tablet electronic device 2 is regarded as an axis, the distance between the holding portion 24 and the gravity center G' is an arm L' of force, a rotating torque T' is got by multiplying the total weight of the tablet electronic device 2 and the electronic component 23 (which can be regarded as applying force at the gravity center G') and the arm of force.

Referring both to FIG. 1 and FIG. 2, the arm L' of force between the holding portion 24 and the gravity center G' in FIG. 2 is smaller than that in FIG. 1, and thus the rotating torque T' is smaller than the rotating torque T. Consequently, the configuration of the tablet electronic device in the embodiment relieves the tiredness of hands effectively. Similarly, if the gravity center G' approaches the second side 21, the arm L' of force is smaller, and the rotating torque T' is smaller accordingly. Thus, the user can hold the tablet electronic device 2 with one hand easily, and especially more convenient for the users to read or handwrite for a long time or operate outdoors or at work.

Figure 3:
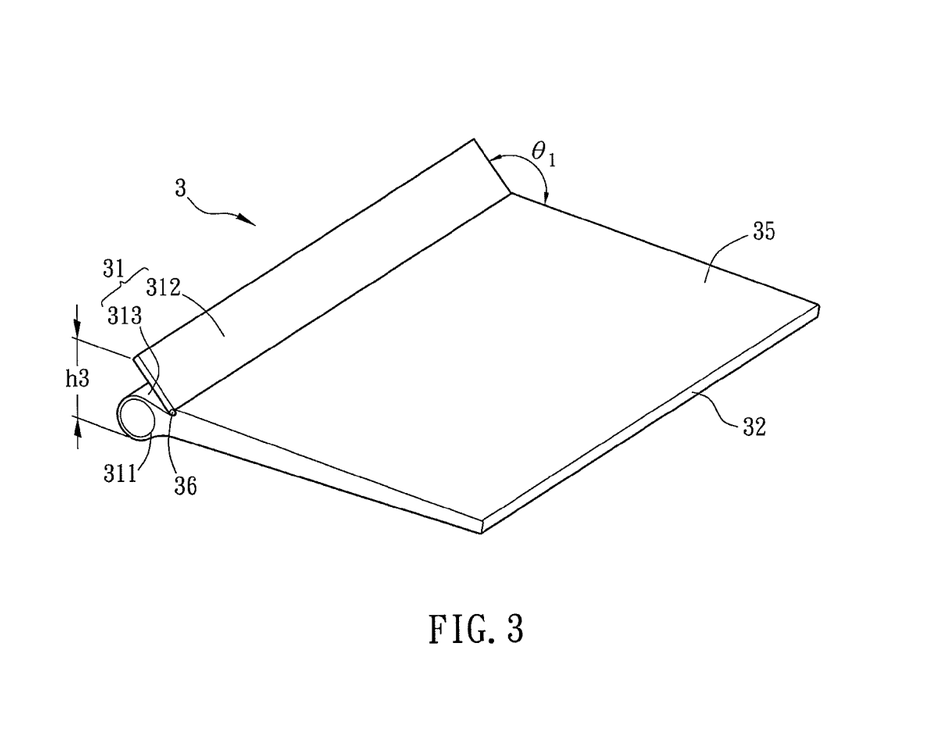
FIG. 3 is a schematic diagram showing a tablet electronic device in a second embodiment.

FIG. 3 is a schematic diagram showing that a tablet electronic device in a second embodiment. The tablet electronic device has configurations and features similar to that shown in FIG. 2, however, an operating body 35 and a holding element 312 are included in the tablet electronic device 3. The operating body 35 is located between the first side 32 and the second side 31 of the tablet electronic device 3. The operating body 35 in the embodiment is a part for touch control and image display, which inclides a touch panel, a circuit board, a processor, a hard disk or other must-have components. The holding element 312 is at a portion near the second side 31, and thus it can be regarded that the second side 31 includes the area together with the holding element 312 and the casing 313 that forms the recess 311. Further, the thickness h3 of the second side 31 is a total thickness of the holding element 312 and the casing 313, and the second side 31 is thicker than the first side 32.

Specifically, the holding element 312 is for the users to hold with one hand, and it fits the thumb and the part between the thumb and the index finger (i.e. thumb web) where the other four fingers are put under the holding portion to support the tablet electronic device 3. The holding element 312 may be connected to the operating body 35 in many ways. In the embodiment, the holding element 312 is pivotally connected to the operating body 35 via a pivot 36 such as a pivot or a hinge without limitation herein, and forms an angle θ1 with the operating body 35. The angle θ1 may be any degree between 90 degrees to 150 degrees.

Consequently, the holding element 312 can rotate within 90 degrees to 150 degrees of θ1, and the user can adjust the angle according to the requirement. In an embodiment, the holding element 312 may also include a rough, uneven or anti-skid arc surface (not shown) to improve a friction coefficient and a fitting degree of the holding element 312 and reduce the possibility of drop down by accident when the user holds.

Figure 4:
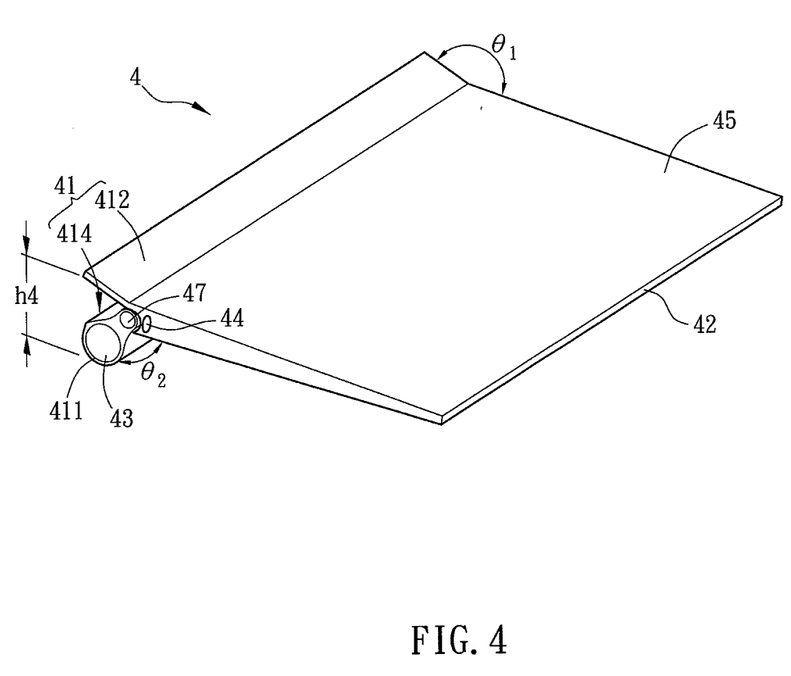
FIG. 4 is a schematic diagram showing a tablet electronic device in a third embodiment.

FIG. 4 is a schematic diagram showing a tablet electronic device in a third embodiment. The difference between the tablet electronic devices in FIG. 3 and in FIG. 4 is that the holding element 412 and the operating body 45 are integrated formed and the angle θ1 therebetween is constant in FIG. 4. Furthermore, the second side 41 of the tablet electronic device 4 includes a rotating part 414 pivotally connected to the operating body 45, and the recess 411 is formed in the rotating part 414. Thus, the second side 41 includes the holding element 412 and the rotating part 414, its thickness h4 is a total thickness of the holding element 412 and the rotating part 414, and the second side 41 is thicker than the first side 42. The rotating part 414 pivotally connected to the operating body 45 via a pivot 47 or a hinge, which is not limited herein.

In detail, the rotating part 414 includes the recess 411 accommodating an electronic component 43 of the tablet electronic device 4, and the rotating part 414 can rotate relative to the operating body 45 to form an angle θ2 therebetween. The angle θ2 may be any degree between 90 degrees to 150 degrees, which is not limited herein. Since the rotating part 414 can rotate relative to the operating body 45, it can rotate upwards to attach to undersurface of the holding element 412 as a holding portion. Besides, the rotating part 414 can also rotate downwards (as shown in FIG. 4) to adjust a supporting angle to support the tablet electronic device 4 on a surface, and thus the user may feel more comfortable in watching or typing words.

In an embodiment, the tablet electronic device may further include a fastening element 44 to fasten the rotating part and the operating body and fix the rotating angle therebetween for the whole structure more steady, this also avoids the rotating angle been changed easily under the gravity or external force. Furthermore, the fixing angle of the fastening element 44 may be preset in several constant angles. Thus when the user changes the using state of the tablet electronic device, he or she can adjust the needed angle quickly. The fastening element 44 can also be applied to the tablet electronic device in other embodiments to fasten the holding element and the operating body and fix the angle therebetween.

Figure 5:
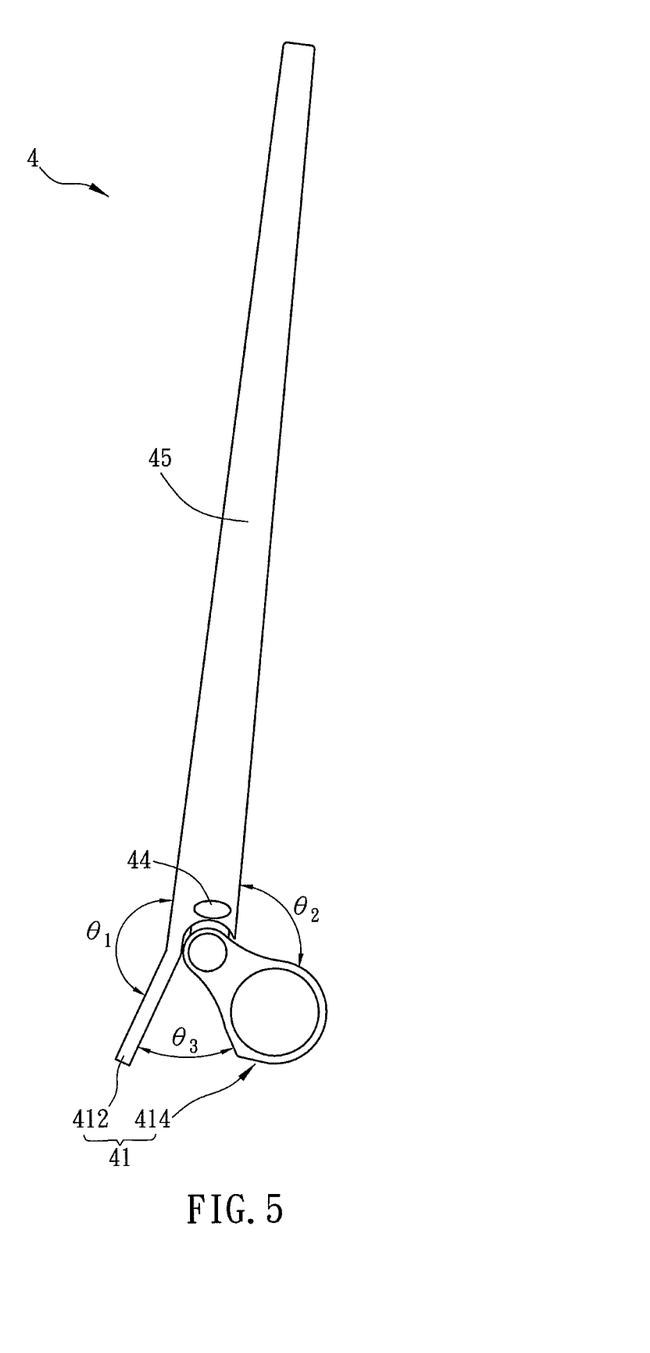
FIG. 5 is a side view showing the tablet electronic device in FIG. 4 when it is upright.

Referring to both FIG. 4 and FIG. 5. FIG. 5 is a side view showing the tablet electronic device in FIG. 4 when it is at the upright position. The tablet electronic device 4 can be handheld or flat put, and it can also be put upright on a plane surface to be used as a digital frame or a desktop display. When the tablet electronic device 4 is at the upright position, the holding element 412 and the rotating part 414 can be supporters of the tablet electronic device 4 via the angle θ1 between the holding element 412 and the operating body 45, and the angle θ2 between the rotating part 414 and the operating body 45 fixed by the fastening element 44. The tablet electronic device 4 stands at a plane surface steady via an angle θ3 between the holding element 412 and the rotating part 414.

Figure 6:
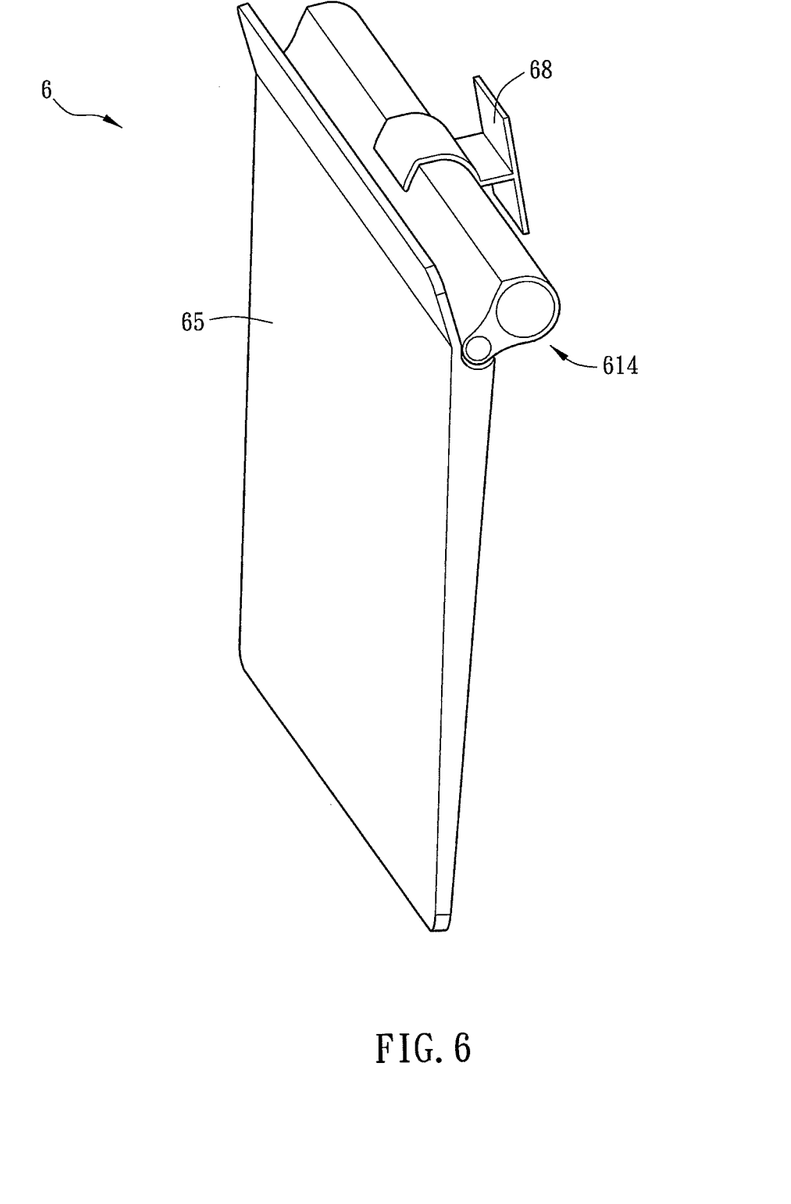
FIG. 6 is a schematic diagram showing a tablet electronic device in a fourth embodiment.

FIG. 6 is a schematic diagram showing a tablet electronic device in a fourth embodiment. The tablet electronic device 6 can be handheld, flat put or upright stand while operation, and it can also be hung up or attached to a wall as a smart information display. Compared to the tablet electronic device in FIG. 4, the difference is that the tablet electronic device 6 further includes an auxiliary element 68. The auxiliary element 68 is connected to the rotating part 614 and rotates relatively to the operating body 65 to adjust an angle therebetween. In the embodiment, the tablet electronic device 6 is attached to a wall via the auxiliary element 68. The auxiliary element 68 is a detachable fixing member which is used to hang the tablet electronic device 6 up. The fixing member of the auxiliary element 68 is not limited, which may be a clamp, a hook, a screw locker or a plate with Velcro (i.e. the hook and loop fasteners). In the embodiment, the auxiliary element 68 is a plate with Velcro as an example.

Figure 7:
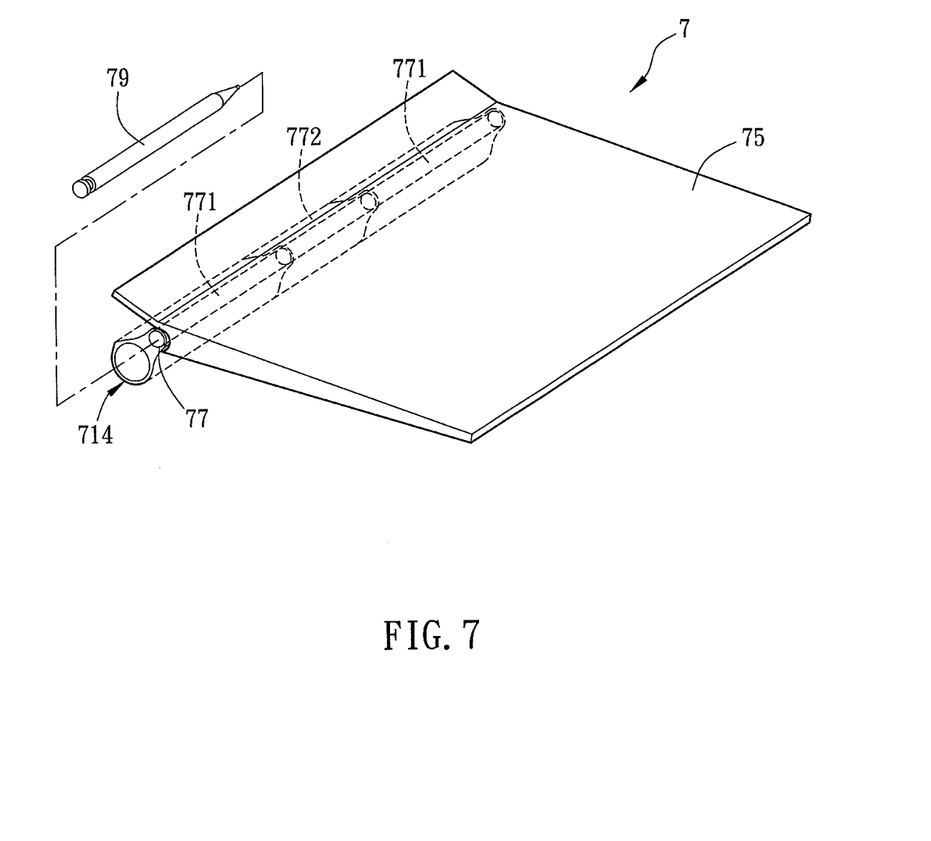
FIG. 7 is a sectional schematic diagram showing a tablet electronic device in a fifth embodiment.

FIG. 7 is a sectional schematic diagram showing a tablet electronic device in a fifth embodiment. The rotating part 714 of the tablet electronic device 7 is pivotally connected to the operating body 75 via the pivot 77. Compared to the tablet electronic device in FIG. 4, the difference is that the pivot 77 at least includes an accommodating space 771. In the embodiment, two ends of the pivot 77 are hollow to form an accommodating space 771, respectively, and a middle part 772 is used as a pivot. The accommodating space 771 may be used for accommodating a handheld touch control element 79 of the tablet electronic device 7 to facilitate the user to take and accommodate the handheld touch control element 79. The handheld touch control element 79 may be a stylus providing a precise input function for the user.

Figure 8:
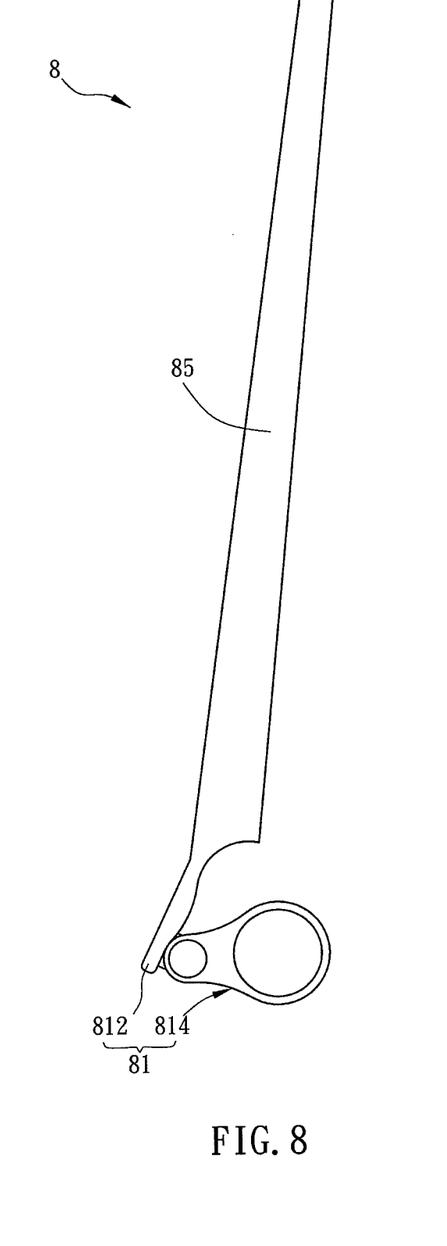
FIG. 8 is a side view showing a tablet electronic device when it is upright in a sixth embodiment.

FIG. 8 is a side view showing a tablet electronic device when it is at an upright position in a sixth embodiment. The structure and features of the tablet electronic device 8 are similar to those of the tablet electronic device in FIG. 5, and the tablet electronic device 8 also includes a fastening element 44, an auxiliary element and a pivot for accommodating a handheld touch control element. The difference is that the rotating part 814 of the tablet electronic device 8 is pivotally connected to the holding element 812 at the second side 81. In the embodiment, the rotating part 814 is pivotally connected to one side of the holding element 812 away from the operating body 85. Consequently, the rotating part 814 rotates relative to the holding element 812, and it can rotate upwards to attach to undersurface of the holding element 812 for holding. Besides, the rotating part 814 can also rotate downwards for the user to adjust a supporting angle when the tablet electronic device 8 is put flat, or the rotating part 814 and the holding element 812 are as two supporters to make the tablet electronic device 8 stand stably on a plane when the tablet electronic device 8 is at an upright position.

Figure 9:
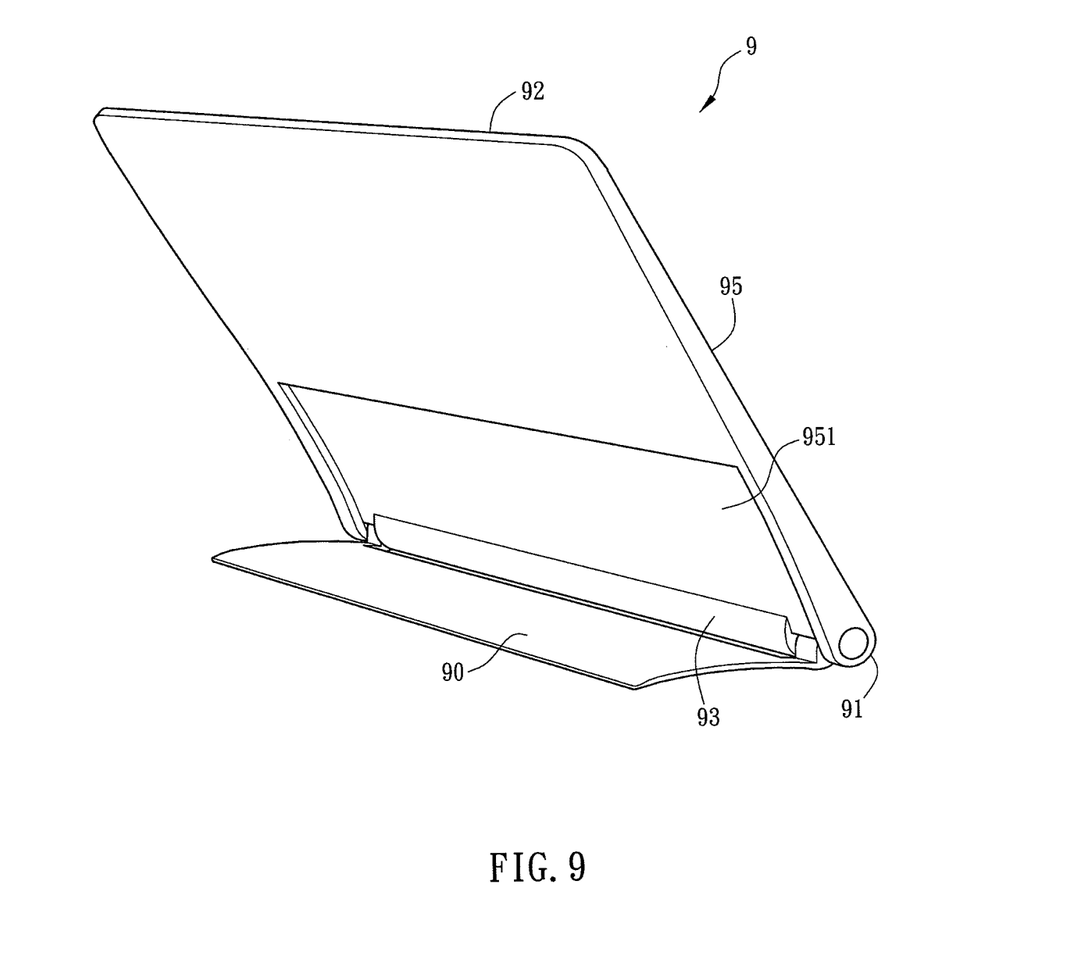
FIG. 9 is a back view showing a tablet electronic device in a seventh embodiment.

FIG. 9 is a back view showing a tablet electronic device in a seventh embodiment. The structure and features of the tablet electronic device 9 are similar with those of the tablet electronic device in FIG. 2. The difference therebetween is that the tablet electronic device 9 further includes an operating body 95 and a bracket 90. The operating body 95 is between the first side 92 and the second side 91 of the tablet electronic device 9. The operating body 95 in the embodiment is a part of the tablet electronic device 9 for touch control and image display, and it includes a touch panel, a circuit board, a processor a hard disk and any other must-have components that omitted herein. In an embodiment, the bracket 90 is pivotally connected to the second side 91 and can rotate relatively to adjust an angle therebetween. The fastening element 44 may also be used to fasten the bracket 90 and the second side 91 and fix the rotating angle between the bracket 90 and the second side 91 to make the bracket 90 support the whole structure stably, and the rotating angle would not be changed easily even under the gravity or external force. On the other hand, an accommodating recess 951 may be formed at a back side of the tablet electronic device 9. The accommodating recess 951 accommodates the electronic component 93, and the bracket 90 also can be accommodated in the accommodating recess 951 when it rotates relative to the second side 91, for easy portable.

Compared to the conventional tablet PC, since its one side of the tablet electronic device is thicker, when the user operates the tablet electronic device with one hand, it is easy for the user to hold and convenient to operate outdoors or at work. Moreover, the gravity center of the tablet electronic device is adjusted towards the second side which accommodates a heavy electronic component such as a battery pack. Thus, when the user holds the tablet electronic device, an arm of force between the gravity center and the holding portion is smaller, and the rotating torque is also smaller, so as to effectively relieve the burden of the hand. Consequently, the user can keep holding the tablet electronic device with one hand to read or operate for a long time easily, and the tablet electronic device is not easily dropped. In the tablet electronic device, the recess of the second side can match with a cylindrical battery pack or a cannular battery pack which is cheaper to replace the thin battery which is both expensive and needs customization. Thus, the manufacture cost is reduced, and the standardization is easily popularized.

Furthermore, the tablet electronic device can be used more widely by some variations in structure. For example, via the holding element and the rotating part disposed in the second side as supporting feet, the tablet electronic device can stand upright on the desk to be used as a digital frame or a desktop display. The tablet electronic device can also be hung up or attached to a wall to be used as a smart display via a combination of the auxiliary element and the rotating part.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A tablet electronic device comprising:
a first side having a first thickness;
a second side opposite to the first side and having a second thickness, wherein the second thickness is larger than the first thickness, and the second side has a recess, a rotating part and a holding element;
an electronic component accommodated in the recess; and
an operating body between the first side and the second side, the rotating part is pivotally connected to the operating body;
wherein a gravity center of the tablet electronic device is located near the second side, and when the tablet electronic device is at an upright position, the tablet electronic device is supported by the holding element and the rotating part.

2. The tablet electronic device according to claim 1, wherein the second side is a holding portion of the tablet electronic device.

3. The tablet electronic device according to claim 1, wherein the operating body and the holding element are integrated formed.

4. The tablet electronic device according to claim 1, wherein the holding element and the operating body forms an angle therebetween.

5. The tablet electronic device according to claim 1, wherein the holding element is pivotally connected to the operating body wherein the holding element is pivotally connected to the operating body.

6. The tablet electronic device according to claim 1, wherein the recess is formed in the rotating part.

7. The tablet electronic device according to claim 6, wherein the tablet electronic device further includes a fastening element for fastening the rotating part with the operating body and the rotating part with the holding element, and the fastening element also fixing a rotating angle between the rotating part and the operating body and the rotating angle between the rotating part and the holding element.

8. The tablet electronic device according to claim 6, wherein the tablet electronic device further includes an auxiliary element connected to the rotating part and capable of rotating relative to the operating body or the holding element.

9. The tablet electronic device according to claim 6, wherein the rotating part is pivotally connected to the operating body or the holding element via a pivot, and the pivot includes at least an accommodating space for accommodating a handheld touch control element of the tablet electronic device.

10. The tablet electronic device according to claim 1, wherein the electronic component is a battery pack, an adaptor or the combination thereof.

11. The tablet electronic device according to claim 1, wherein the tablet electronic device further includes an accommodating recess and a bracket, wherein the accommodating recess is formed at a back side of the tablet electronic device and the bracket is accommodated in the accommodating recess.

12. A tablet electronic device comprising:
a first side having a first thickness;
a second side opposite to the first side and having a second thickness, wherein the second thickness is larger than the first thickness, and the second side has a recess, a rotating part and a holding element, and the recess is formed in the rotating part;
an operating body located between the first side and the second side; and
an electronic component accommodated in the recess;
wherein a gravity center of the tablet electronic device is located near the second side, and the rotating part is pivotally connected to one side of the holding element away from the operating body.

* * * * *